United States Patent [19]

Gass et al.

[11] Patent Number: 5,475,678
[45] Date of Patent: Dec. 12, 1995

[54] SIGNALLING PROCESSING SYSTEM FOR CIRCUIT MODE SYSTEMS OF A TELECOMMUNICATIONS INSTALLATION

[75] Inventors: Raymond Gass, Bolsenheim; Christine Cordonnier, Wolfisheim, both of France

[73] Assignee: Alcatel N.V., Amsterdam, Netherlands

[21] Appl. No.: 180,300

[22] Filed: Jan. 12, 1994

[30] Foreign Application Priority Data

Jan. 13, 1993 [FR] France .................................. 93 00236

[51] Int. Cl.⁶ .................................................. H04L 12/52
[52] U.S. Cl. .................... 370/58.2; 370/68.1; 370/110.1; 379/93; 379/230
[58] Field of Search ................................ 370/58.2, 58.3, 370/68.1, 110.1; 379/90, 93, 230

[56] References Cited

U.S. PATENT DOCUMENTS

| | | | |
|---|---|---|---|
| 4,421,955 | 12/1983 | Mori et al. | 179/18 |
| 4,837,816 | 6/1989 | Mizuhara et al. | 379/230 X |
| 5,046,067 | 9/1991 | Kimbrough | 370/110.1 |
| 5,224,108 | 6/1993 | McDysan et al. | 370/110.1 |
| 5,303,236 | 4/1994 | Kunimoto et al. | 370/110.1 X |

FOREIGN PATENT DOCUMENTS 2665314  1/1992  France ......................... H04L 12/28

OTHER PUBLICATIONS

J. Junttila et al, "Application du systeme de commutation numerique DX 200 a differentes interfaces de signalisation", *Actes Du Colloque International De Commutation*, 7–11 May 1979, pp. 1236–1238.

F. H. Rees et al, "Message transmission in the Network of System X Exchanges", *Actes Du Colloque, 10E Colloque International De Commutation*, Sep. 1981, Session 21A, pp. 6, pp. 1–6.

French Search Report FR 9300236 dated Sep. 28, 1993.

*Primary Examiner*—Douglas W. Olms
*Assistant Examiner*—Russell W. Blum
*Attorney, Agent, or Firm*—Sughrue, Mion, Zinn, Macpeak & Seas

[57] ABSTRACT

System for processing signalling relating to user equipments for the core system of a telecommunication installation constructed around circuit mode units connecting user equipments, auxiliary units and/or control or processing equipments. Each unit has means for adapting the signalling information for said user equipments, auxiliary units or control or processing equipments connected for transmission of said signalling information internally in a standardized form which can be switched by the unit and means for preprocessing signalling information to the benefit of the microprocessor, the auxiliary unit or the control or processing equipment responsible for processing it.

7 Claims, 3 Drawing Sheets

SIGNALLING PROCESSING SYSTEM FOR CIRCUIT MODE SYSTEMS OF A TELECOMMUNICATIONS INSTALLATION

BACKGROUND OF THE INVENTION

1. Field of the Invention

The invention concerns a signalling processing system relating to equipment made available to users for a circuit mode system which is constructed around units interconnected by a local area network of point-to-point temporal circuits in a telecommunications installation, these units being employed among other things to connect equipments made available to users in the installation, possibly to connect auxiliary devices and/or to connect control or processing equipments of the installation.

2. Description of the Prior Art

French patent application 2 665 314 describes an interconnect network for an integrated services digital telecommunication installation core in which the core units are interconnected by point-to-point circuits which are organized according to the specific requirements of the units connected. This interconnect network includes a subnetwork interconnecting the circuit mode units of the installation core, i.e. those involved directly or indirectly in synchronous time-division switching, in the installation, of information transferred successively in the form of binary blocks of the same size, a block usually consisting of one byte and the transfer period being 125 µs in the usual case of switching 64 kbit/s circuits.

This enables the transfer of structured information at 8 kHz, including transmission of speech or other audio frequency signals sampled and coded in the form of bytes and the transmission of data also in the form of bytes.

The units concerned include those found in telecommunication installations including those used to connect various user equipments and/or to connect associated auxiliary units and those formed by a control or processing equipment.

The units for connecting user equipments are, for example, of the telephone interface controller type, interface controllers for telecommunication equipments connectable to S0/T0 or S2/T2 interfaces as defined by the CCITT, and interface controllers for dedicated user equipments, i.e. equipments used according to a specific standard implemented in the installation in question.

In the known manner, the analogue and digital user equipments of an installation are connected to the installation by interface circuits, as mentioned above. These interface circuits enable transit of information exchanged on demand between the equipments through the installation to which these equipments are directly connected or at least able to be connected.

In the known manner exchanges of information between user equipments in particular between each equipment and the interface circuit by means of which it is connected to the installation, involve exchanges of signalling. It is the same when these equipments communicate with an auxiliary unit connected to an interface controller or to a control or processing equipment of the installation. Exchanges of signalling involving a user equipment are governed by a specific protocol which can be processed by this type of equipment.

To this end each user equipment includes a logic system for processing signalling information received or to be transmitted, using a given protocol, and the same must apply at the interface controller to which it is connected. Given the wide variety of communication requirements, there are many types of user equipment which may co-exist within the same installation, which may therefore have to support different protocols simultaneously.

Each interface controller circuit therefore includes input/output interface modules at which the transmission circuits connecting it to each of the user equipments that it serves terminate. Each of these modules is designed and/or possibly programmed according to the characteristics of the transmission LINK it is to serve and the protocol that is to be used for exchanges of information using the LINK. Various modules are thus likely to be used conjointly in the interface circuits of one and the same installation, even in one and the same interface circuit.

The interface circuits usually include internal logic enabling them to process and/or steer signalling received from user equipment that they serve, via the interface modules to which these equipments are connected; this logic also enables the sending of signalling in the reverse direction through the interface module. As there is a wide variety of user equipments and consequently of protocols and interface modules, it is also necessary to provide interface circuit internal logic capable of adapting to the various foreseeable variants, if possible in a simple, flexible and low-cost manner.

SUMMARY OF THE INVENTION

The invention consists in a system for processing signalling relating to user equipments for the core system of a telecommunication installation constructed around circuit mode units interconnected by a local area network of point-to-point time-division links (circuits), said units connecting user equipments in the installation, auxiliary units and/or control or processing equipments, in which system each unit has interfaces for connecting user equipments, auxiliary units or control or processing equipments connected to it and a communication circuit supervised by a microprocessor and connected to the latter and to internal time-division multiplex circuits serving the interfaces of the unit and to point-to-point time-division circuits connected to the unit for communications between said user equipments, auxiliary units or control or processing units connected to it, with said microprocessor and with said user equipments, auxiliary units or control or processing equipments accessible via other units of said circuit mode system comprises means for adapting the signalling information for said user equipments, auxiliary units or control or processing equipments connected at least to said interfaces for transmission of said signalling information internally in a standardized form which can be switched by said communication circuit of said unit by means of which said signalling information is exchanged, and means for preprocessing signalling information to the benefit of said microprocessor of said unit in question or of said auxiliary unit or said control or processing equipment responsible for processing it in said system.

The invention, its features and its advantages are explained in the following description given with reference to the figures listed below.

DETAILED DESCRIPTION OF THE PREFERRED EMBODIMENT

Figure 1:
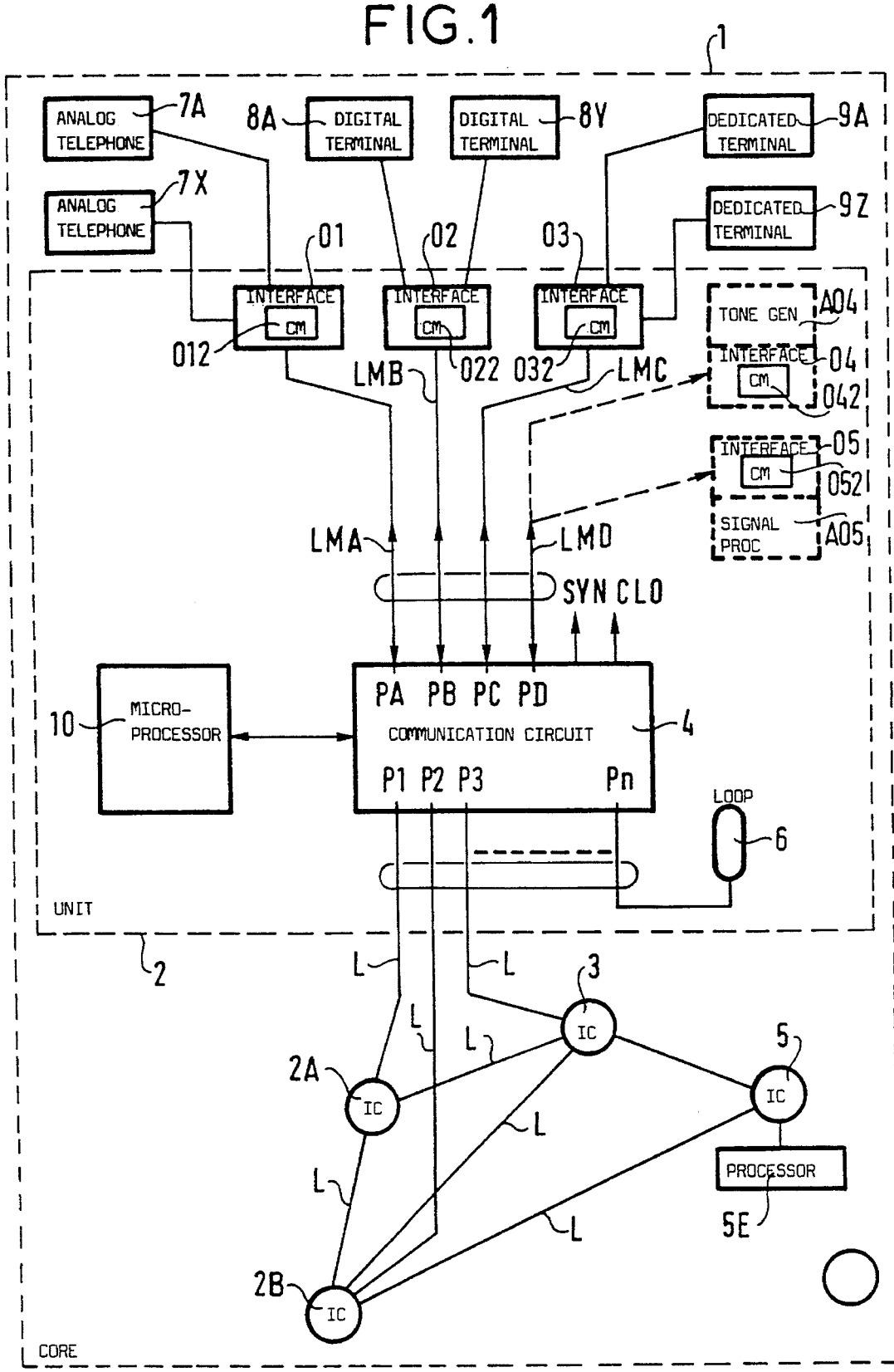
FIG. 1 shows a block diagram of one example of a telecommunication installation in which one of the units consisting of an interface circuit for connecting user equipments is partially developed.

The telecommunication installation shown in FIG. 1 is a digital multiservice installation including a core 1 which has an interconnect network preferably as described in French patent application 2 665 314. This network interconnects the units which constitute the core 1 in pairs over point-to-point circuits as and when required.

These units are implemented on individual circuit boards (not shown), for example, which are grouped together within a common cabinet or case type structure in which the core of the installation is therefore located. In a preferred embodiment of the invention these circuit boards communicate with each other through an interconnect network implemented on a backplane circuit board on which the interconnecting circuits are implemented and to which the various circuit boards are connected at board locations (slots) provided with appropriate connection means.

The interconnect network may be made up of a plurality of subnetworks individually assigned to different services, one of these subnetworks, the only one considered here, being assigned to communication between circuit mode units of the installation core.

These circuit mode units usually include interface controllers 2, 2A and 2B for connecting equipments to be used by users in the installation and interface controllers for dedicated control or processing equipments, for instance an interface controller 3 for a main control equipment and an interface controller 5 for a dedicated equipment 5E for centralized processing of transcoding or possibly signalling for example.

The interface controllers for connecting equipments are adapted to enable usually bidirectional transmission of information between the user equipments connected to them and other, compatible user equipments with which they can communicate via the circuit mode subnetwork of the installation of which they are part.

The subnetwork therefore includes bidirectional point-to-point circuits L which are specifically tailored to the requirements of the units they connect; in this example these circuits L support transmissions using a common time frame structure.

This frame has a period of 125 µs for example, and in this example is divided into "p" equal time slots enabling transfer of digitized information via "p" 64 kbit/s channels (p=128, for example).

Each unit 2, 2A, . . . , 2B, 3 or 5 of the circuit mode subnetwork includes a communication circuit 4, implemented as an integrated circuit in this example.

Each communication circuit 4 connects the unit of which it is part (the unit 2, for example) to the other units of the same subnetwork via a first group of circuits L. It can also connect the unit of which it is part via a second group of circuits LMA, . . . , LMD to interfaces for connecting equipments used by the users, or to interfaces for connecting auxiliary units, in both cases connected to the unit 2 concerned.

Of the interfaces 01, 02, 03 for connecting equipments, the interface 01 (for example) is a line module for connecting equipments 7A, . . . , 7X such as analog telephones, the interface 02 is a line module for connecting equipments 8A, . . . , 8Y such as digital subscriber terminals for connection at the S2 or T2 level as defined by the CCITT, and the interface 03 is a line module for connecting equipments 9A, . . . , 9Z such as dedicated digital subscriber terminals.

Two interfaces 04 and 05 for connecting auxiliary units are described below.

Each connection interface can include dedicated means for causing signalling information passing through it to conform to the transmission protocol used by the user equipments, the auxiliary unit or the control or processing equipment that it serves, as explained below. In this example there are dedicated means CM of this kind 012 through 052 for the respective interfaces 01 through 05.

Note that the same unit, the unit 2, for example, is often required to be connected to identical or similar interfaces, if the size of the installation of which it is part allows this, and it must be understood that the organization shown in FIG. 1, in which the various types of interface for connecting user equipments are all connected to a single communication circuit, does not reflect a usual organization of a real installation.

For example, the interfaces 04 and 05 for auxiliary units are respectively for a tone generator A04 of an interface controller for telephones and a signal processor A05 of a unit for processing multifrequency signalling and/or signals transmitted in the form of tones.

In this example each communication circuit 4 is under the control of a microprocessor 10 responsible for supervising it within the unit of which it is part and it includes a clock circuit enabling it to extract clock signals CL0 and synchronization signals SYN from signals that it receives, for example, via one of the circuits to which it is connected and, inter alia, for the benefit of the user equipments and auxiliary units connected to the unit.

In this embodiment of the invention each communication circuit 4 has "n" ports P1 through Pn by which it can be connected over "n–1" point-to-point circuits L to "n–1" respective communication circuits, each incorporated in a respective other unit of the installation. A loop 6 is implemented at port Pn, on the backplane circuit board, for example. It enables the unit 2 incorporating the communication circuit 4 to transmit information in a loop over the specific circuit L which constitutes this loop.

Each communication circuit 4 also has "q" individual ports PA, PB, PC, PD, for the same number of bidirectional circuits LMA through LMD and which are provided, inter alia, for connecting user equipment and/or auxiliary unit interfaces to the unit including it.

These time-division circuits LMA through LMD, of which there are four in this example, support time-division transmission using the same frame structure with a period of 125 µs and each provides the same number of time slots or channels, in this example 32×64 kbit/s channels.

Figure 2:
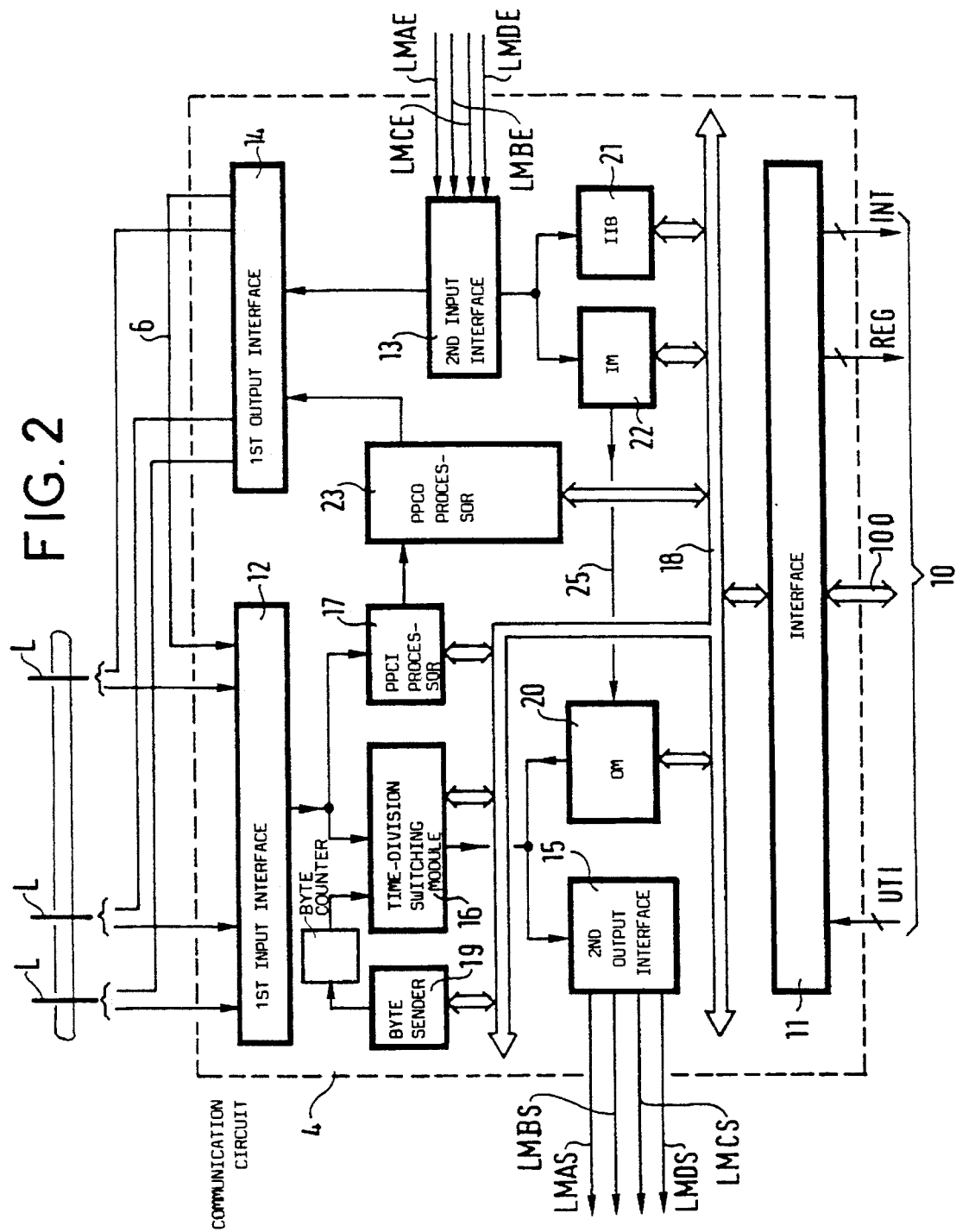
FIG. 2 shows a block diagram of a circuit mode support type interface circuit for connecting user equipments to an installation as shown in FIG. 1.
Figure 3:
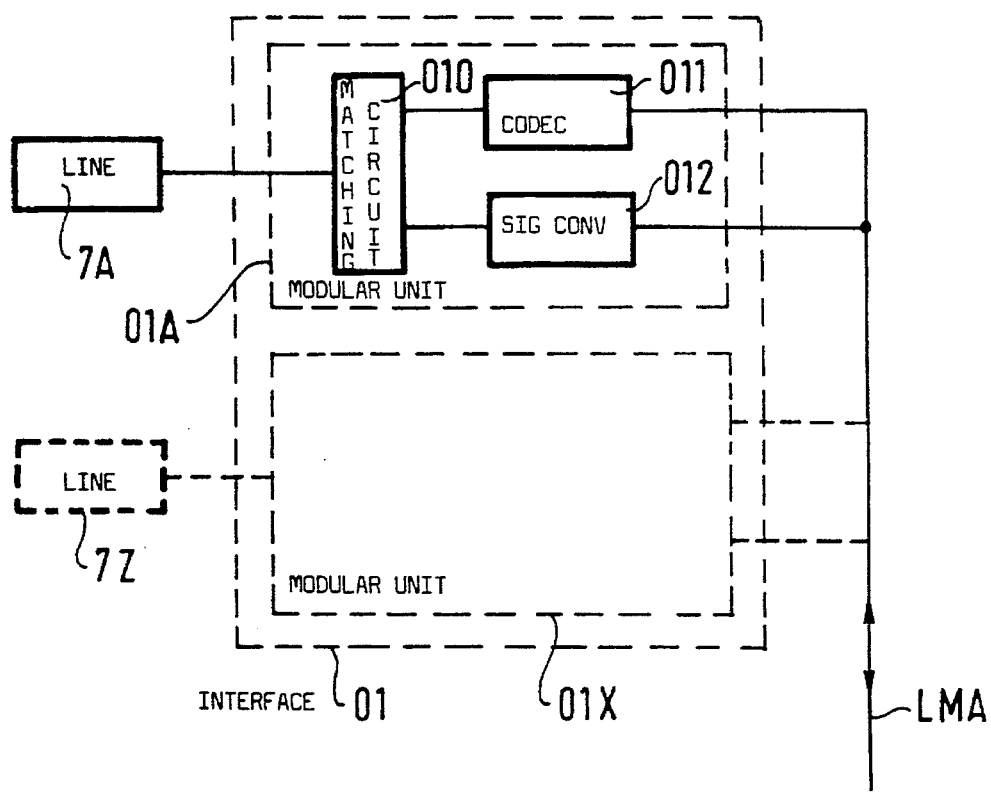
FIG. 3 shows a block diagram of an interface for connecting equipments of the analogue telephone type.

FIG. 2 shows in more detail the functional units of a communication circuit 4 and in particular those which are essential to the signalling system in accordance with the invention.

As mentioned above, each communication circuit 4 communicates with the microprocessor 10 responsible for supervising it in the unit of which it is part and accordingly includes an interface 11 which is known in itself. This interface 11 is used to connect the communication circuit 4 to the bus 100 of the microprocessor 10 and in particular to send interrupts and data transmission requests to the microprocessor 10 via dedicated circuits INT and REQ. It also enables reception of select, write, read, reset, test, etc instructions from the microprocessor 10 via a set of circuits UTI.

Each communication circuit 4 has a first input interface 12 which, in the known manner, receives and synchronizes in phase the digital signals from the incoming link of each of the various circuits L connected to this circuit. In this implementation this interface also multiplexes bytes from incoming links when the latter actually convey information to the unit in which the interface is included, following parallelization of the bits received serially for each byte.

A second input interface 13 is also provided in each communication circuit 4 to receive the data from the incoming links LMAE through LMDE of the time-division multiplex circuits LMA through LMD connected to this circuit.

The communication circuit 4 has a first output interface 14 which is used to transmit to other units of the circuit mode subnetwork via the outgoing links of the circuits L connected to the communication circuit 4. A second output interface 15 implements the same functions in relation to the outgoing links LMAS through LMDS of the time-division multiplex circuits LMA through LMD already discussed above. Each communication circuit 4 also includes a time-division switching module 16 between the first input interface 12 and the second output interface 15. It is of the type described in French patent application 2 673 785, for example. It is assumed here to be controlled by a content-addressable memory, in the known way, and under the control of the microprocessor 10 associated with the communication circuit 4 of which it is part. Each switching operation corresponds to the sending of one byte systematically obtained by summing two bytes previously stored and which are addressed simultaneously, so that one of the stored bytes can be sent, if the other is a null value byte, or the sum byte can be sent, at will. This enables switching of information bytes in transit for a call and possibly for a conference call and also enables bidirectional transmission of commands and signalling. It is also possible to compare two bytes from different sources, as the value of the byte resulting from summing them indicates whether they are identical or not and enables detection of a characteristic byte in a given time-division channel during a succession of time frames; likewise a change in the value of a byte in a time-division channel can be detected knowing the value previously stored for the same channel. In one implementation the number of incoming time-division channels that can be processed by the switching module 4 is equal to 4,096 and enables service of a group of 32 incoming links L each of which includes 128 channels and two internal links with the same capacity used by the communication circuit itself. In this example, and as mentioned elsewhere, the second output interface serves four outgoing multiplex links LMAS through LMDS each of which carries 32 time-division channels. The second input interface 13 includes a number of incoming multiplex links LMAE through LMDE and a number of time-division channels per link which correspond to the number of outgoing multiplex links and to the number of time-division channels per link of the second output interface 15 mentioned above. It enables the transfer of bytes received on these various incoming link channels to the output interface 14 to which it is directly connected and to the microprocessor 10. The user equipments or auxiliary units which may be connected to a unit are connected to it by an interface 01, . . . , 05 which communicates with the communication circuit 4 of this unit over at least one of the time-division multiplexed circuits LMA, . . . , LMD connected to this circuit.

To this end the interfaces conventionally include registers (not shown) for temporary storage of information to be exchanged and the necessary transmit and/or receive synchronization. They may also contain devices (not shown) for causing signalling information from user equipments or auxiliary units to conform to a standardized format internal to the installation such that they can be switched by the time-division switching module 16 of the circuit mode system.

In one embodiment, the bytes constitute the basic elements of all internal signalling transmitted through the system described above, all internal signalling information being made up of one or more bytes, as required by the user equipments, auxiliary units or control or processing equipments concerned.

In each case, signalling information is exchanged between a unit and the user equipments or auxiliary units to which it is connected by register to register exchanges between the interfaces 01, . . . , 05 of these user equipments or auxiliary units and the input interfaces 13 and output interfaces 15 of the communication circuit 4 concerned, via the circuits LMA through LMD which interconnect these various interfaces.

The interfaces 13 and 15 of the communication circuit are identical, regardless of the communication circuit 4 concerned, as they are designed for groups of time-division multiplex circuits LMA through LMD which are identically constituted and organized. In this embodiment the input interface 13 and the output interface 15 each include 128 registers for temporarily storing the bytes received in each frame on the incoming links LMAE, . . . LMDE connected to the former and the bytes to be sent on the outgoing links LMAS, . . . , LMDS connected to the latter.

On the other hand, the interfaces 01, . . . , 05 are necessarily organized to suit the characteristics of the user equipments or auxiliary units that they serve for their connection to these user equipments or auxiliary units.

In a first application example, an interface 01 for pulse dialling analog telephones includes one or more modular units 01A, . . . , 01Z each having an electrical matching circuit 010 to which the line 7A from the telephone is connected, a codec 011 and a signalling converter 012; these last two units connect the matching circuit to the time-division multiplex circuit (LMA, for example) to which the interface 01 is connected. A bidirectional channel of predetermined rank of the multiplex circuit LMA is reserved to the codec 011 for speech signals to or from the telephone 7A. Another bidirectional channel of the multiplex circuit LMA is reserved to the converter 012 for transmission in the form of bytes of change of state signalling produced by the telephone 7A or for signalling sent to it in the form of bytes, the role of this signalling converter 012 in relation to the signalling being similar to that of the codec in relation to the speech signals.

The signalling bytes produced by the microprocessor 10 of a unit 2 addressed to a user equipment connected to this unit, such as the telephone 7A, are sent on the time-division channel reserved to that user equipment on the outgoing link (LMAS, for example) of the circuit LMA to which it is connected by its interface 01.

To this end the microprocessor 10 actuates a byte sender 19 in the associated communication circuit 4 connected to it by the bus 100, this sender being structured to have produced, on demand, the various signalling bytes which are translated by status commands determined by the signalling converters which receive them.

As each signalling byte that can be produced by a unit, such as the unit 2, corresponds to a particular combination of eight bits, it is possible to have the various combinations produced in succession by a byte counter connected to the input of the switching module 16 able to switch them on demand and at the appropriate time to the selected outgoing time-division channels. In this implementation such sending uses two counters (not shown) which access the switching module 16 at the level of the time-division multiplex point-to-point links L of the loop 6 between the interfaces 14 and 12.

The sending of a specific signalling byte to a user equipment on a given outgoing time-division channel is therefore achieved by switching a byte produced by one of the send counters at a given time and consequently in a given incoming time-division channel of a circuit L to an outgoing time-division channel of a time-division multiplex circuit (LMA, for example). This is done by the switching module 16 under the control of the byte sender 19 which is appropriately programmed to bring this about.

In the opposite direction, the microprocessor 10 can be advised by a processor 21 for processing isolated incoming bytes of any change occurring on the time-division channels of the incoming time-division circuits LMAE, . . . , LMDE assigned to transmitting signalling for user equipments using change of state signalling.

The isolated incoming byte processor 21 is organized in a manner that is known in itself to monitor the time-division channels which carry this signalling. This monitoring is effected, for example, by systematically comparing any byte received on any of the monitored channels with the byte previously received on the same channel, given that each new byte transmitted by a channel is temporarily stored in a register assigned to that channel in the input interface 13 before it is in turn replaced by the byte transmitted after it on the same channel.

A change on a monitored channel causes the isolated incoming byte processor 21 to act according to the earlier state or states processed for this channel and the corresponding programming selected to govern it under these conditions, this programming possibly varying dynamically as requirements change, for example under the control of the associated microprocessor 10 and possibly a control unit of the installation.

The isolated incoming byte processor 21 is thus able to trigger the sending of an interrupt INT to the microprocessor 10 associated with it if the comparison effected for a given signalling time-division channel indicates a change or if the value of the byte received corresponds to a pre-programmed value, preferably stored at the input interface 13.

The microprocessor 10 to which the isolated incoming byte processor 21 is connected via the bus 100 is then advised of the change or of the arrival of the expected signalling byte by an interrupt sent to the microprocessor by the processor for this purpose.

Waiting for signalling indicative of expected or random events is thus supervised by the isolated incoming byte processor 21 which is dynamically programmed to this end, in accordance with actual requirements. Temporary storage at the input interface 13 of the signalling bytes arriving on incoming time-division channels also enables the isolated incoming byte processor 21 to handle transient events. In a preferred embodiment the communication circuit 4 and in particular its input interface 12 are adapted to enable the possible supervision of all time-division channels of all incoming time-division circuits LMAE, . . . , LMDE connected to it.

Another application example provides different preprocessing of signalling when some at least of the user equipments are analog telephones which can send DTMF signalling, in particular during the dialing phase, the devices described above being unable to process such signalling in the normal state of affairs.

The bytes transmitted by a channel which may transmit signalling in this form are then passed to a dedicated signal processor. In the system according to the invention a signal processor of this kind may constitute an auxiliary unit such as the unit 05 in FIG. 1 or part of a centralized equipment such as the equipment 5E assumed to be served by the interface circuit, the latter being connected by a time-division point-to-point circuit L to the unit 2 in the installation under consideration here.

The microprocessor 10 controls the switching by the switching module 16 of the bytes received from the incoming channel concerned of the time-division multiplex circuit (circuit LMAE, for example), to which the user equipment using the signalling is connected, in such a manner as to steer these bytes either to an outgoing channel of the time-division multiplex circuit (circuit LMD, for example) which serves the auxiliary unit 05 or to an outgoing channel of the time-division point-to-point circuit L serving the interface controller 5 of the centralized equipment 5E, which is assumed to be adapted to process DTMF signalling. The DTMF information processed either by the auxiliary unit 05 or by the centralized equipment is then transcoded to yield bytes coded in such a way that they can be processed by the unit intended to act on them, for example the microprocessor 10 of the unit 2 from which the DTMF information in question originates.

The bytes obtained by such transcoding are then sent to the unit 2 via the circuit LMD or via the circuit L, as appropriate. When signalling bytes reach the switching circuit 4 via one of the time-division multiplex circuits LMAE, . . . , LMDE, they are normally processed by the isolated incoming byte processor 21 which acts as previously in relation to the microprocessor 10, advising the latter only of meaningful events to which it is required to respond.

The microprocessor 10 could also communicate with an auxiliary unit (04 or 05, for example) or a centralized equipment (5E, for example) over the multiplex circuits between them. This enables the microprocessor 10 to have a specific processing operation carried out by an auxiliary unit, for example retrieving signalling information transcoded into a specific code (the R2 or Q23 code, for example) in a given received time-division channel.

Processing of signalling exchanged between digital type user equipments and the unit to which they are connected via the interface 02 or 03 to which they are connected is facilitated by the fact that the signalling information is digitized at this level into a form which can be transmitted directly in byte form and because, if necessary, bit rate conversion is effected by an appropriate converter arrangement, 022, 032 for the user equipments in FIG. 1, and 042 and 052 for the auxiliary units 04 and 05.

The signalling information is transmitted in fully coded form when the ISDN equipments 8A, . . . , 8Y are designed to be connected at a standard level as defined by a standardizing body such as the CCITT in the case of integrated services digital networks. In the case of ISDN user equipments designed to be connected at the basic access level S2/T2, the time-division multiplexed circuits LMA, . . . , LMD which connect the interface 02 of these ISDN user equipments to the communication circuit 4 associated with this interface have the usual standardized frame structure in which the time-division channels corresponding to time slots 1 through 15 and 17 through 21 are assigned to the transfer of information bytes, the time-division channel corresponding to time slot 16 being assigned to the transfer of signalling bytes relating to the information transfer channels mentioned above.

In the case of digital user equipments 9A, . . . , 9Z, for example, corresponding to dedicated terminals, four time-division channels are assigned per equipment, in both transmission directions, on each time-division multiplex circuit LMA, . . . , LMD connecting the interface 03 which serves them to the communication circuit 4 of the unit 2 to which these equipments are connected.

Each user equipment has two channels B1 and B2 for transferring information, a channel D and a supplementary channel S for transferring internal signalling data bidirectionally on one of the circuits LMA, . . . , LMD serving the interface 03 to which the equipment in question is connected.

An appropriate organization (not shown) of the time-division channels serving the various interfaces 01, 02, 03 available for serving the various user equipments enables the time-division channels of the same rank of the circuits LMA, . . . , LMD to be assigned, as far as possible, to identical or similar functions for different interfaces. This applies to time-division channel number 16, for example, which is systematically assigned to transferring signalling regardless of the interface controller, and partly in the case of channel number 0 which is usually assigned to transferring a synchronization byte when the interface serves ISDN type user equipments and is alternatively assigned here to transferring signalling bytes for the interfaces serving the other user equipments.

In the case of the user equipments 9A through 9Z of the dedicated digital terminal type considered here, a particular exchange procedure in the form of messages is adopted for signalling within the installation and applies to all of the circuit mode system.

These signalling messages are, for example, those required to display information, especially in alphanumeric form, on a screen of a user equipment, a signalling message of this kind possibly coming in from any unit of the installation, in the case of standard administration messages, or from another user equipment in the case of individualized messages.

To this end the transfer of any such signalling message is necessarily preceded by a request sent by the potential sender on the S channel to the potential receiver, transfer of all or part of the message being initiated by the sender only after it receives an acquiescence sent in the opposite direction over the opposite direction time-division channel S by the receiver indicating that the latter is ready to receive.

To this end the communication circuit 4 of a unit includes an incoming message (IM) processor—see FIG. 2—associated with the input interface 13 for monitoring the incoming links of the time-division multiplex circuits LMA, . . . , LMD connected to the unit to detect requests sent by the equipments 9A, . . . , 90 concerned for the purposes of transmitting messages.

Each equipment then uses the S channel individually assigned to it on one of the incoming links.

This S channel corresponds, for example, to time-division channel number 0 on the link LMAE or the first user equipment connected to the interface 03. This channel is known to be reserved to synchronization bytes, not transmitted to the unit, in the case of an incoming link LMAE from an interface 02 for connecting ISDN terminals, the interface 02 being assumed to be connected to a communication circuit 4 of a different unit.

Each message, made up of bytes, includes a header followed by a number of bytes constituting the information content of the message to be transmitted. A message ends with a checksum calculated from the information bytes of the message by the sender.

The incoming message processor 22 detects requests sent by the user equipments to which S channels are assigned on the links LMA, . . . , LMS connecting the interface 03 to which they are connected to the communication circuit 4 of the unit to which they are connected.

These requests are in the form of a specific configuration of bits to which the incoming message processor 22 responds by sending an interrupt INT to the microprocessor 10 of the unit containing this processor. Each interrupt is processed by the microprocessor 10 according to its available capacity for receiving information and in particular allowing for any requests from elsewhere, especially from other units of the installation. The microprocessor 10 requests an outgoing message (OM) processor 20 to send an acquiescence. This processor is connected to the bus 100 of the microprocessor and to the output interface 15 of the communication circuit 4 which is associated with this microprocessor and which contains the outgoing message processor 20.

An acquiescence is sent to an equipment by sending a specific configuration of bits different to that corresponding to a request on the outgoing time-division channel S reserved to this user equipment in the time-division multiplex circuit connecting it to the communication circuit 4 in question.

Figure 4:
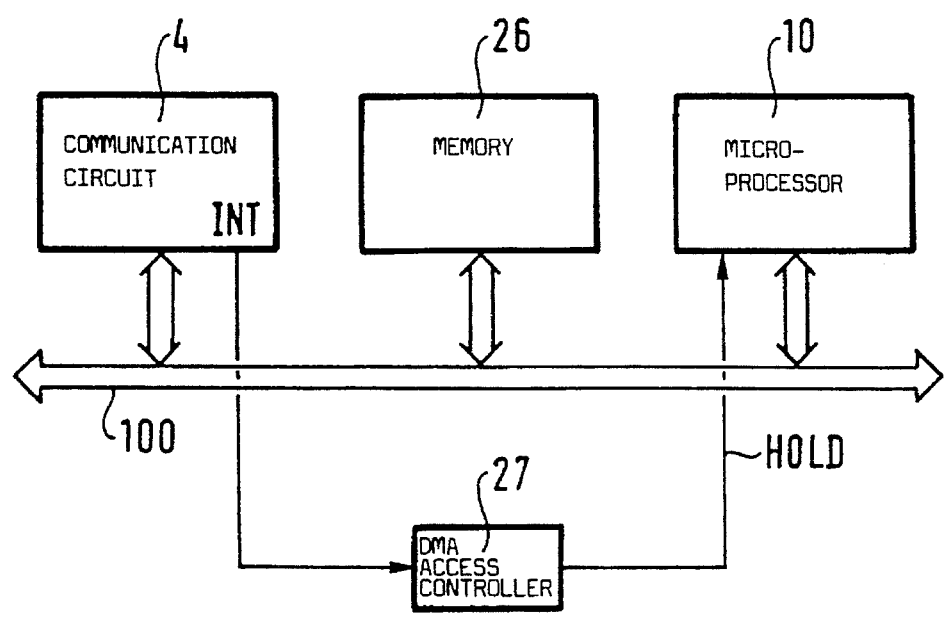
FIG. 4 shows a block diagram of interface circuit memory access arrangements.

The reception of an acquiescence by an equipment on the S channel outgoing from the communication circuit 4 to which it is connected causes this equipment to send the corresponding message on the incoming S channel in the communication circuit 4 which is reserved for it. Reception of this message is supervised by the incoming message processor 22 which stores the bytes constituting the message in a memory 26—see FIG. 4—and monitors correct reception on behalf of the microprocessor 10.

In this implementation the memory 26 in which these messages are stored is that associated with the microprocessor 10 for its specific requirements. It is therefore connected to the bus 100 to which the microprocessor and the associated communication circuit 4 are connected. A direct memory access controller 27 shares memory access time between the microprocessor 10 and the communication circuit 4, in a manner that is known in itself.

The incoming message processor 22 stores the message received from a user equipment in the memory 26 and sends an interrupt to the microprocessor 10 when all the bytes constituting the message have been received, the number of bytes being indicated in the header of the message. The incoming message processor 22 then advises the microprocessor 10 that it has received the expected message, indicates the location at which the bytes of the message are stored in the memory 26 and advises whether the correct transmission check that it has carried out on the message matches or does not match the checksum transmitted at the end of the message.

The microprocessor 10 processes the message stored in the memory 26 for administration purposes if the message is addressed to the microprocessor, or in order to transmit it to another user equipment or auxiliary unit connected to the unit including the memory 26 in question and to which the message is addressed, or in order to transmit it to another user equipment, auxiliary unit or control or processing equipment via one of the other units of the installation.

In the first case in which a message stored in the memory 26 is intended to be transmitted to a user equipment or auxiliary unit connected to the unit including the memory 26, transmission is via the outgoing time-division multiplex links LMAS, . . . , LMDS connected to the communication circuit 4 of the unit and is supervised by the outgoing message processor 20. The latter is then actuated by the microprocessor 10 which causes it to send a request to the user equipment or auxiliary unit to which a message is addressed, using the outgoing S channel reserved to that equipment. This responds on the incoming S channel which is also reserved to it and the acquiescence transmitted for this purpose is processed by the associated message processor 22. The outgoing message processor 20 is immediately advised that the acquiescence has been received via the direct link 25 which connects it to its associate and initiates the operations required to transfer the message to the user equipment to which it is addressed via the output interface 15 and the outgoing channel S reserved to this equipment. These operations result in byte by byte transmission of a message whose structure is as described above for messages transmitted from user equipments to the unit to which they are connected, the bytes of the message being taken from the memory 25 in which they were previously stored at the instigation of the outgoing message processor 20. As mentioned above, the signalling message produced by a user equipment or an auxiliary unit connected to a unit can also be transmitted to a user equipment, auxiliary unit or control or processing equipment connected to another unit of the installation or served via some such other unit. Any message of this kind is then placed in the memory 26 of the unit to which it is initially sent by its originator by the method explained, this message being distinguished from the messages previously described by the internal destination address written in the header used to transmit it to the unit containing the memory 26 in question. Sending to the local destination installation unit is effected under the control of a point-to-point circuit L output (PPCO) processor 23 which controls the extraction of bytes from the message stored in the memory 26 of the sending unit and conditions them in the form for transmission over the circuit L connecting the two units concerned. As this does not constitute any part of the invention it is not described in further detail. As shown in FIG. 2, the processor 23 of a communication circuit 4 is connected to the bus 100 serving the microprocessor 10 associated with this circuit in the unit which contains them and to the output interface 14 on point-to-point circuits L of the communication circuit 4. Likewise for transmitting signalling messages in the reverse direction from one unit to another a point-to-point circuit L input (PPCI) processor 17 is provided in each communication circuit 4. This processor 17 is connected to the input interface to which are connected all the circuits L which access the communication circuit in question and to the bus 100 connecting the latter to the microprocessor 10 and to the memory 26 with which it is associated in the unit containing them.

The input processor 17 of a communication circuit transfers any signalling messages received over the circuits L to the memory of the microprocessor 10 associated with the circuit in question after "deconditioning" them by a series of operations which can be regarded as the converse of those carried out by the output processor 23, these operations not being described in detail here in that they do not form any part of the present invention.

There is claimed:

1. A system for processing signalling relating to user devices for a core system of a telecommunication installation, said core system containing a plurality of circuit mode units interconnected by a first group of point-to-point time-division multiplex links;

each of said units including: control processing means, switching means, first interface means for connecting said user devices, auxiliary devices, and/or control or processing devices to the installation for transmission and switching of circuit mode information and signalling; and second interface means for said first group of point-to-point time-division multiplex links;

each unit also including means for adapting signalling before transmission between said units;

wherein each unit comprises a communication circuit including:

said second interface means, input/output interface means connected to said first interface means by a second group of time-division multiplex links, switching means for switching information and signalling between said input/output interface means, said second interface means and said control processing means of said unit, and means for preprocessing signalling information transmitted to said unit's control processing means and to said control and processing devices.

2. Signalling processing system according to claim 1, wherein said communication circuit of said unit includes means for preprocessing byte type signalling combining a byte sender with at least one byte counter connected to said switching means of said communication circuit to switch, under control of a microprocessor associated with said communication circuit, signalling bytes produced by said counter to outgoing time-division channels, of said second group of time-division multiplex links connecting said user devices and/or auxiliary devices to said unit, which are connected to said communication circuit.

3. The signalling processing system according to claim 1, wherein said communication circuit of said unit includes means for preprocessing byte type signalling combining an isolated incoming byte processor with comparators for monitoring signalling bytes transmitted by incoming time-division channels of said second group of time-division multiplex links connecting said user devices and/or auxiliary devices to the unit, in order to advise a microprocessor associated with said communication circuit in said unit of significant variations of signalling bytes in the monitored incoming time division channels.

4. The signalling processing system according to claim 1, wherein said communication circuit of said unit comprises means for preprocessing message type signalling including an outgoing signalling message processor for sending on demand, on outgoing time-division channels of said second group of time division multiplex links connecting said user devices and/or auxiliary devices, message bytes previously stored in said unit, under the supervision of said microprocessor associated with said communication circuit, using a particular message transmission protocol employed by said outgoing signalling message processor.

5. The signalling processing system according to claim 4, wherein the signalling message bytes sent under control of said outgoing signalling message processor are stored in a memory to which said microprocessor of said unit, including said outgoing signalling message processor, has access for carrying out said processing.

6. The signalling processing system according to claim 1, wherein said communication circuit of said unit includes means for preprocessing message type signalling, including an incoming signalling message processor for processing on demand and using a specific transmission protocol, message bytes received on particular incoming time-division channels of said second group of time-division multiplex links connecting said user devices and/or auxiliary devices, and for storing said messages in a memory directly accessible by means of said incoming signalling message processor and said microprocessor associated with said communication circuit.

7. The signalling processing system according to claim 1, wherein said communication circuit is an integrated circuit.

* * * * *